United States Patent [19]
Liese

[11] Patent Number: 5,703,338
[45] Date of Patent: Dec. 30, 1997

[54] SOUND ABSORBER

[76] Inventor: Hermann Liese, Truderingerstr. 2, D-82008, Unterhaching, Germany

[21] Appl. No.: 491,843
[22] PCT Filed: Oct. 21, 1994
[86] PCT No.: PCT/EP94/03474
  § 371 Date: Oct. 10, 1995
  § 102(e) Date: Oct. 10, 1995
[87] PCT Pub. No.: WO95/11372
  PCT Pub. Date: Apr. 27, 1995

[30] Foreign Application Priority Data

Oct. 21, 1993 [DE] Germany ............... 9316060 U

[51] Int. Cl.⁶ .................................................. F01N 1/08
[52] U.S. Cl. .................. 181/264; 181/268; 181/281
[58] Field of Search ............................... 181/264, 265, 181/281, 268, 269, 270

[56] References Cited

U.S. PATENT DOCUMENTS

| | | | |
|---|---|---|---|
| 1,081,348 | 12/1913 | Unke et al. ..................... | 181/264 |
| 4,167,987 | 9/1979 | Turner ............................. | 181/281 X |
| 4,890,691 | 1/1990 | Chingho . | |
| 5,123,502 | 6/1992 | Flugger ........................... | 181/264 |
| 5,492,195 | 2/1996 | Zink et al. ...................... | 181/264 |

FOREIGN PATENT DOCUMENTS

| | | |
|---|---|---|
| 1285014 | 1/1962 | France . |
| 9210988 | 12/1992 | Germany . |
| 63-277812 | 11/1988 | Japan . |

*Primary Examiner*—Khanh Dang
*Attorney, Agent, or Firm*—Knobbe, Martens, Olson & Bear, LLP

[57] ABSTRACT

A sound absorber for jet engines and the like including a housing defining an inflow opening and an outflow opening. Sound absorbing elements positioned within the housing define substantially parallel entrance and exit planes. The sound absorbing elements include a plurality of gas guidance and baffle elements in two spaced-apart and parallel row-like arrangements, the elements having U-shaped, V-shaped, or semicircular cross-sections. The rows of sound absorbing elements are offset and the elements arranged such that the opened cross-sectional areas face each other in overlapping fashion. The entrance plane and the exit plane are inclined relative to an entrance flow through the inflow opening within an angular range of between 0° to less than 90°. The flow into the sound absorber is divided into first partial flows between adjacent sound absorbing elements, whereupon each first partial flow splits into two second partial flows each of which merge with an adjacent second partial flow to form common a third partial flow directed toward the exit plane.

8 Claims, 3 Drawing Sheets

SOUND ABSORBER

FIELD OF THE INVENTION

The present invention relates to a sound absorber consisting of one or a plurality of sound absorbing elements which are installed in a round or oval guidance channel through which a flow acted upon by sound extends.

BACKGROUND OF THE INVENTION

Such devices are, for instance, known as exhaust systems on engines or air guides of air conditioning systems. In such systems a sound insulation is achieved by arranging "baffle plates" in the guidance channel (reflection damping) or by perforating the guidance channel and simultaneous covering with sound-absorbing materials (such as rock wool) between perforated guide pipe and another gas-tight covering (absorption damping).

In these systems a satisfactory sound absorption can only be accomplished at great overall lengths and thus at great amounts of material and great weights.

The present invention is based on the utility model registered under Register No. G 92 10 988.8 for a sound absorbing device for rectangular cross-sections.

SUMMARY OF THE INVENTION

It is the object of the present invention to improve a sound absorber in such a manner that an increased sound absorption can be achieved with the efforts spent on space, material and weight being small.

It is also the object of the present invention to provide a sound absorber of the above-mentioned type which avoids the drawbacks of the prior art and nevertheless has a small size under optimized flow conditions, at a high absorbing performance and at an optimized exhaust gas counterpressure.

In accordance with the invention, the object is attained by providing a sound absorber with a housing having inflow and outflow openings and sound absorbing elements therebetween. The sound absorbing elements define parallel entrance and exit planes inclined at an angle of less than 90° with respect to a flow through the inflow opening.

The invention is especially suited for sound absorbing measures in systems in which there is little space available and whose weights are restricted and in which, at the same time, the maximum pressure is limited at a given throughput.

The sound absorber known from utility model 92 10 988.8 has only a limited absorbing effect, since the entrance flow impinges at a right angle onto the entrance plane. This may lead to undesired reflections of the sound waves and may be detrimental to the flow characteristics. Another disadvantage is that only rectangular cross-sections can be realized in the prior-art sound absorber. By contrast, the invention makes it possible to guide the entrance flow at a flat angle against the entrance plane. This will effect substantially improved sound absorbing characteristics which are above all due to the improved flow characteristics. In addition, it is possible to give the sound absorber a smaller size or to install a larger number of sound absorbing elements within a given volume.

These demands are, for instance, made on sound absorbers of aircraft engines which have a critical weight and in which there is only a very limited space available within the engine covering. Moreover, the sound absorber should only produce a limited back-pressure towards the engine.

Conventional systems (absorption dampers) must be mounted outside of the engine covering because of their large dimensions, they are very objectionable from an aerodynamic point of view and heavy.

Making use of the present invention on the sound absorber of an aircraft and integrating an absorbing element with a weight of 0.5 kg, a diameter of 95 mm, and a length of 200 mm into the existing exhaust system, one will achieve an absorbing performance which is improved by 1.5 dB(A) in comparison with a conventional external sound absorbing system having a weight of about 6 kg and a diameter of about 15 cm and a length of 1 m.

This comparison is based on officially acknowledged measurement results.

The improved sound-absorbing effect of the invention is due to the design of the gas guiding channels which respectively unite acoustically identical gas flows in the opposite direction by way of their inner contour and simultaneously form optimum reflection surfaces due to their concave outer contours.

The sound absorber of the invention shows the same degree of sound absorption as compared with conventional systems (reflection, absorption) with considerably smaller efforts being spent on space, weight and material, or a considerably improved sound absorption is achieved under the same efforts.

By arranging the entrance and exit planes on cylindrical or conical surfaces, the present invention permits any adaptation of the radial and lateral dimensions of the flow guiding channel to the secondary conditions made by pressure and throughput.

BRIEF DESCRIPTION OF THE DRAWINGS

The invention shall now be described with reference to embodiments illustrated in the drawing, in which.

DESCRIPTION OF THE PREFERRED EMBODIMENTS

Figure 1:
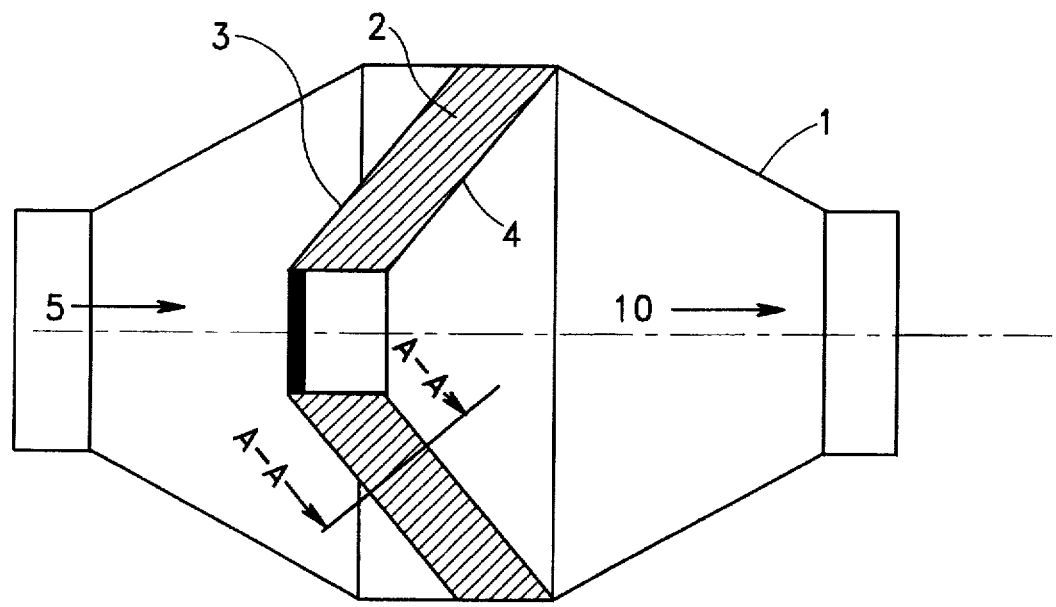
FIG. 1 is a lateral view of a flow guidance channel with a sound absorbing element arranged conically relative to the flow direction.

FIG. 1 is a cross-sectional view through a typical exhaust system. In the embodiment in a sound absorbing element 2 is conically mounted within an enlarged round cross-section relative to the entrance flow 5. The area of the absorbing element 2 which is flown through can be adapted to the prevailing space and pressure conditions by varying the cone angle of the absorbing element 2.

Figure 2:
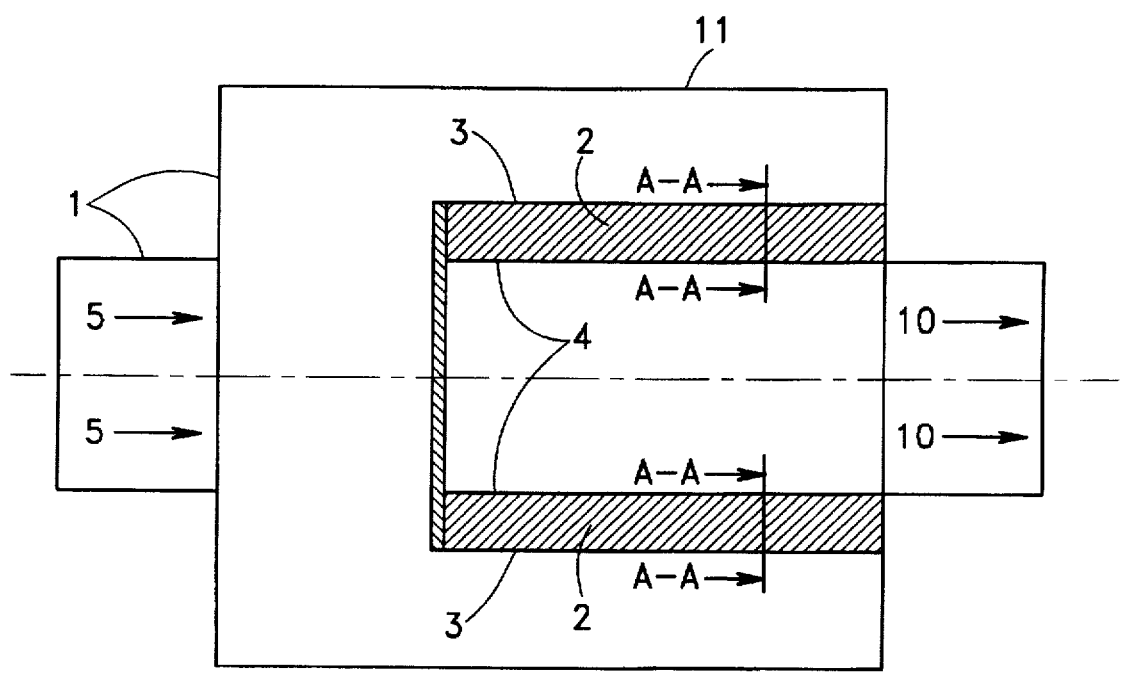
FIG. 2 is a lateral view of a flow guidance channel with entrance plane 3 and exit plane 4 arranged in parallel with the inflow direction.

FIG. 2 is a sectional view through a typical exhaust system in which the entrance flow 5 and the exit flow 10 are located along a common line. The absorbing element 2 has a cylindrical shape and is radially flown through from the outside to the inside.

An adaptation to the prevailing space and pressure conditions is possible by varying the length of the absorbing element 2.

Figure 3:
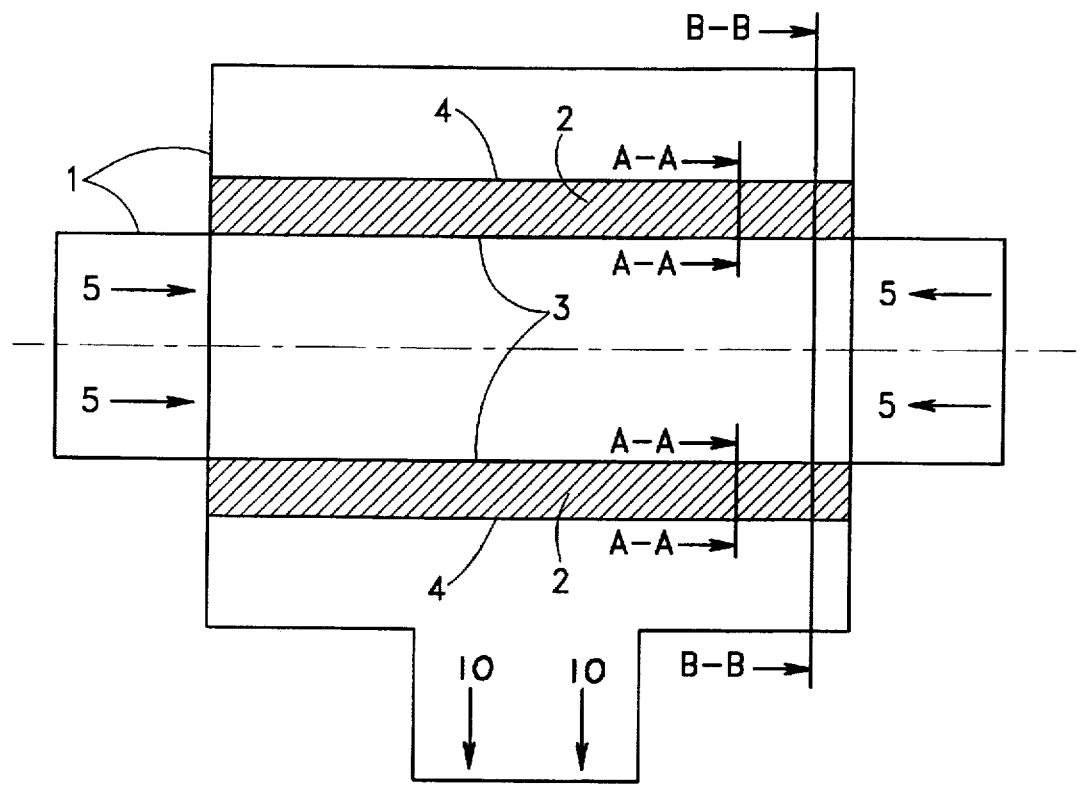
FIG. 3 is a lateral view of a flow guidance channel with entrance plane 3 and exit plane 4 arranged in parallel with the inflow direction with two inflow openings arranged at the same level and a radial outflow opening.

FIG. 3 is a sectional view through a typical exhaust system in which two lateral entrance flows 5 are arranged along a common line. The exit flow 20 as drawn is at a right angle relative to the entrance flow 5. One or a plurality of outflow openings can be provided on the outer casing 11 at any desired angle. The absorbing element 2 has a cylindrical shape and is radially flown through from the inside to the outside.

Any adaptation to the prevailing space and pressure conditions is possible by varying the length of the absorbing element 2.

Figure 4:
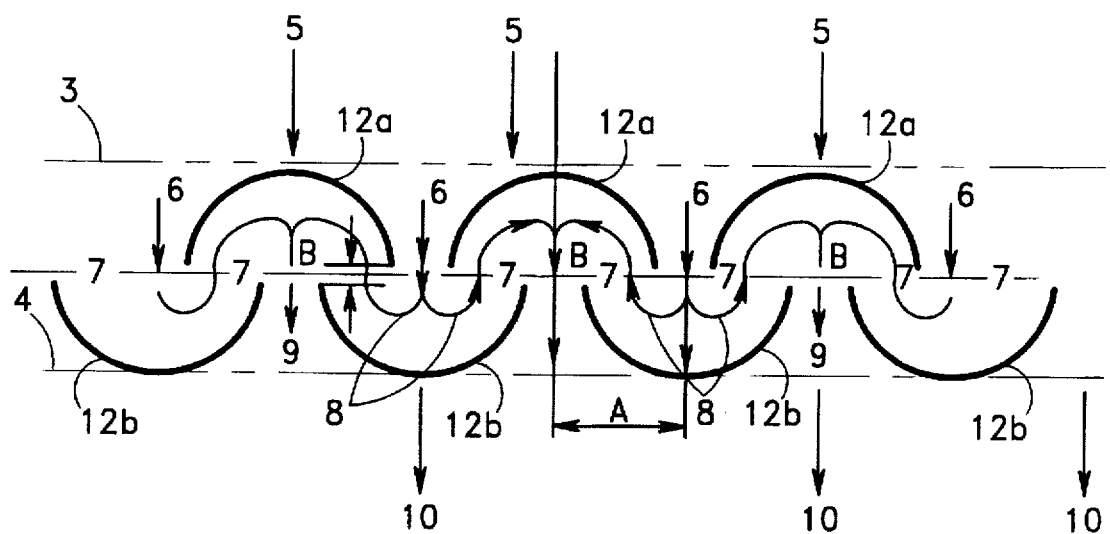
FIG. 4 is an enlarged and straightened radial section of the sound absorbing element of FIG. 1, FIG. 2, and FIG. 3 and taken along line A—A of FIGS. 1, 2 or 3.
Figure 5:
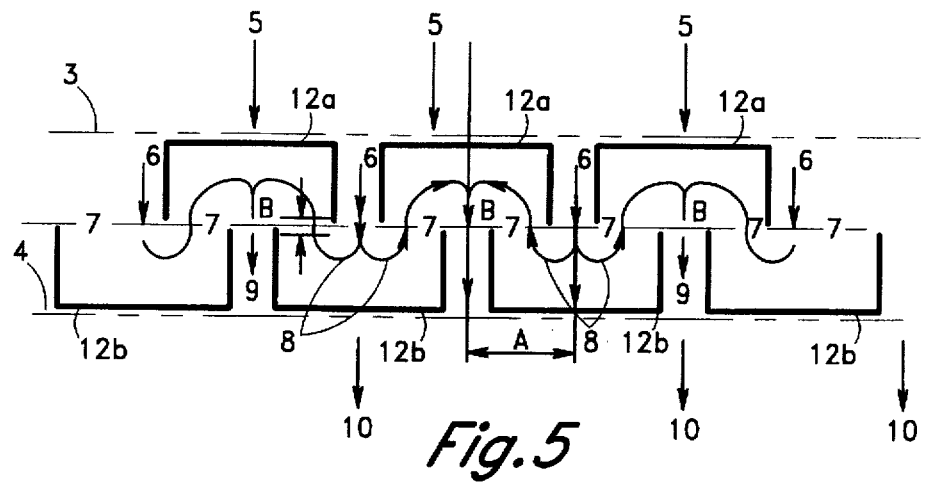
FIG. 5 is a variant of the sound absorbing element illustrated as a radial section by analogy with FIG. 4 and taken along line A—A of FIGS. 1, 2 or 3.
Figure 6:
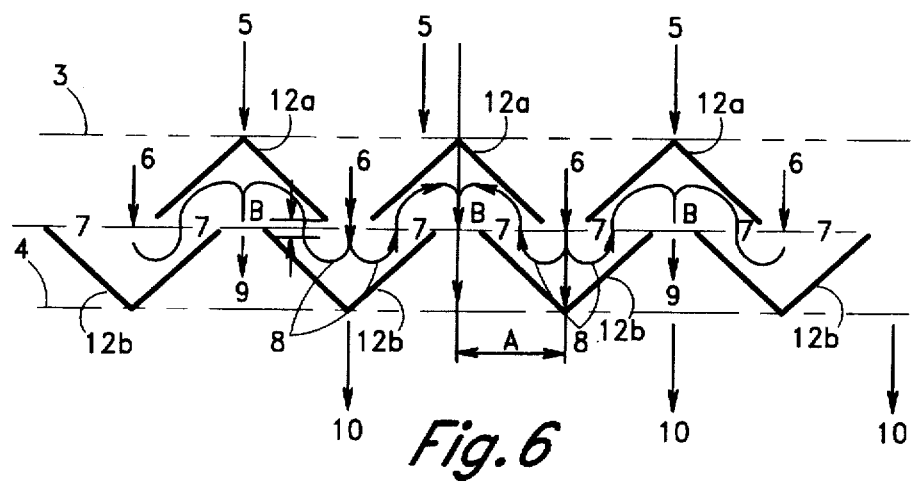
FIG. 6 is a further variant of the sound absorbing element, represented as a radial section by analogy with FIGS. 4 and 5 and taken along line A—A of FIGS. 1, 2 or 3.

FIG. 4, FIG. 5 and FIG. 6 are radial sectional views through the entrance plane 3 and the exit plane 4 and the guidance channels 7 formed by the two planes. Between the entrance and exit planes 3, 4, a plurality of gas guidance and baffle elements are positioned. A first row of elements 12a are U-shaped, V-shaped or semicircular in cross-section and open away from the entrance plane 3. A second row of similarly shaped elements 12b open away from the exit plane toward the first row of elements 12a. The rows of elements 12a, 12b are spaced apart and offset with respect to each other so that the open sides face each other in overlapping fashion.

The sound of the entrance flow 5 which hits upon the entrance plane is largely reflected from the outer surface of the entrance plane, and the entrance flow 5 is divided into a plurality of first partial flows 6 upon passage through the entrance plane 3.

The flow channels 7 which are formed by the entrance plane 3 and the exit plane 4 divide the first partial flows 6 respectively into two further second partial flows 8.

In the further course of the flow channels 7 two second partial flows 8 which have been created by the division of adjacent first partial flows 6 are respectively guided towards each other in the opposite direction, thereby forming one third partial flow 9.

A virtual baffle wall is created by uniting two acoustically identical flows in opposite direction, whereby noise is considerably reduced.

The third partial flows 9 are guided through the exit plane 4 into the flow guidance channel 1 and are combined to form outlet flow 10.

The sides of the exit plane 4 which face away from the exit flow 10 form the ideal aerodynamic shape for producing a uniformly mixed decelerated flow.

Figure 7:
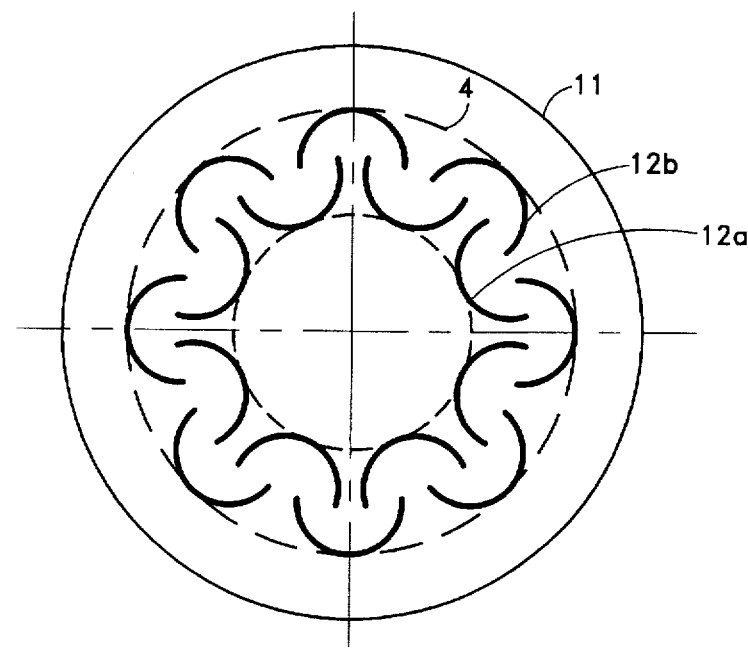
FIG. 7 is a radial section through a sound absorber according to FIG. 2 and FIG. 3 with a cylindrical absorbing element of the type illustrated in FIG. 4 and taken along line B—B of FIG. 3.

FIG. 7 is a sectional view through an exhaust gas system according to FIG. 2 and FIG. 3, with the entrance plane 3 and exit plane 4 in parallel with entrance flow 5, and of the air guide type shown in FIG. 4.

Designations:
1=flow guidance channel
2=sound absorbing element
3=entrance plane
4=exit plane
5=entrance flow
6=first partial flow
7=guidance channel
8=second partial flow
9=third partial flow
10=exit flow
11=outer casing
12a=first plurality of baffle elements
12b=second plurality of baffle elements
A=radial displacement of the entrance plane 3 and the exit plane 4
B=lateral displacement of the entrance plane 3 and the exit plane 4
A—A=sectional plane (partial section through an absorbing element)
B—B=sectional plane (overall section)

I claim:

1. A sound absorber, comprising:
    an outer housing having at least one inflow opening and at least one outflow opening, said housing being adapted to receive a noisy flow of gas entering said housing along an axis through said inflow opening, and exiting said housing through said outflow opening;
    a sound-absorbing element positioned in said housing between said inflow opening and said outflow opening, said sound-absorbing element defining an entrance plane with a substantially unimpeded path to said inflow opening and an exit plane with a substantially unimpeded path to said outflow opening, said entrance and exit planes being substantially parallel with respect to one another; and
    a plurality of baffle elements arranged in two spaced-apart rows, said baffle elements being U-shaped, V-shaped or semicircular in cross-section so as to each have an open side, a first row of said baffle elements being positioned adjacent said entrance plane and opening away from said entrance plane, and a second row of said baffle elements being positioned adjacent said exit plane and opening away from said exit plane toward the first row of elements, the two rows of elements being offset with respect to one another so that the opened sides of the baffle elements face each other in overlapping fashion, and wherein said sound-absorbing element is positioned such that said parallel entrance and exit planes are inclined at an angle of between 0° to less than 90° relative to the axis of flow of said noisy flow through said inflow opening.

2. The sound absorber of claim 1, wherein said sound-absorbing element is formed in a cone shape so that said entrance plane and said exit plane form spaced-apart conical surfaces.

3. The sound absorber of claim 2, wherein an apex of said cone faces toward said inflow opening.

4. The sound absorber of claim 1, wherein said sound-absorbing element is formed as a cylinder so that said entrance plane and said exit plane form spaced-apart cylindrical surfaces having a common axis aligned with said noisy flow through said inflow opening, said sound absorber being formed so that the noisy flow passes radially through said sound-absorbing element toward said outflow opening.

5. The sound absorber of claim 4, wherein said housing and said sound-absorbing element are arranged so that the noisy flow passes radially inward through said sound-absorbing element toward said outflow opening.

6. The sound absorber of claim 4, wherein said housing and said sound-absorbing element are arranged so that the noisy flow passes radially outward through said sound-absorbing element toward said outflow opening.

7. The sound absorber of claim 1, wherein said baffle elements of said first row are spaced apart to form flow dividers adjacent said entrance plane dividing said noisy flow into first partial flows therebetween, said baffle elements in said second row positioned to divert said first partial flows into two divergent second partial flows directed generally toward the baffle elements in said first row, and the baffle elements in said first row positioned to further divert adjacent second partial flows into a common third partial flow directed between baffle elements in said second row and toward said exit plane.

8. The sound absorber of claim 7, wherein the baffle elements in the first and second rows of said sound-absorbing element are symmetrically arranged such that a similar division of flow occurs regardless of the direction of said noisy flow, either from said entrance plane to said exit plane, or from said exit plane to said entrance plane.

* * * * *